United States Patent [19]

Sydansk

[11] Patent Number: 4,995,461

[45] Date of Patent: * Feb. 26, 1991

[54] WELL KILL TREATMENT FOR OIL FIELD WELLBORE OPERATIONS

[75] Inventor: Robert D. Sydansk, Littleton, Colo.

[73] Assignee: Marathon Oil Company, Findlay, Ohio

[*] Notice: The portion of the term of this patent subsequent to Aug. 14, 2007 has been disclaimed.

[21] Appl. No.: 426,131

[22] Filed: Oct. 24, 1989

Related U.S. Application Data

[63] Continuation-in-part of Ser. No. 380,057, Jul. 14, 1989.

[51] Int. Cl.⁵ .............................................. E21B 33/13
[52] U.S. Cl. .................................... 166/295; 166/300; 166/294; 166/270; 166/50
[58] Field of Search ............... 166/295, 308, 300, 294, 166/292, 273, 275, 270, 271, 50

[56] References Cited

U.S. PATENT DOCUMENTS

| | | | |
|---|---|---|---|
| Re. 32,114 | 4/1986 | Argabright et al. | 166/252 |
| 4,391,925 | 7/1983 | Mintz et al. | 523/130 |
| 4,683,949 | 8/1987 | Sydansk et al. | 166/270 |
| 4,688,639 | 8/1987 | Falk | 166/295 |
| 4,706,754 | 11/1987 | Smith | 166/295 |
| 4,722,397 | 2/1988 | Sydansk et al. | 166/50 |
| 4,723,605 | 2/1988 | Sydansk | 166/295 |
| 4,724,906 | 2/1988 | Sydansk | 166/295 |
| 4,730,674 | 3/1988 | Burdge et al. | 166/295 |
| 4,730,675 | 3/1988 | Wygant et al. | 166/295 |
| 4,744,418 | 5/1988 | Sydansk | 166/270 |
| 4,744,419 | 5/1988 | Sydansk et al. | 166/270 |
| 4,770,245 | 9/1988 | Sydansk | 166/295 |
| 4,779,680 | 10/1988 | Sydansk | 166/300 |
| 4,817,719 | 4/1989 | Jennings, Jr. | 166/292 |
| 4,819,727 | 4/1989 | Jennings, Jr. | 166/292 |
| 4,844,168 | 7/1989 | Sydansk | 166/270 |

OTHER PUBLICATIONS

T. E. Hudson et al, Fluid Loss Control Through the Use of a Liquid-Thickened Completion and Workover Brine, SPE 10652, presented at SPE Formation Damage Control Symposium, Lafayette, LA, Mar. 24–25, 1982.

Shuttleworth and Russel, *Journal of the Soc. of Leather Trades' Chemists*, "The Kinetics of Chrome Tannage Part I.," United Kingdom, 1965, v. 49, pp. 133–154; "Part III", United Kingdom, 1965, v. 49, pp. 251–260; Part IV, United Kingdom, 1965, v. 49, pp. 261–268.

Von Erdman, *Das Leder*, "Condensation of Mononuclear Chromium (III) Salts to Polynuclear Compounds", Eduard Roether Verlag, Darmstadt Germany, 1963, v. 14, p. 249.

Udy, Marvin J., *Chromium, vol. 1: Chemistry of Chromium and its Compounds*, Reinhold publishing Corp., N.Y., 1956, pp. 229–233.

Cotton and Wilkinson, *Advanced Inorganic Chemistry 3rd Ed.*, John Wiley and Sonds, Inc., N.Y., 1972, pp. 836–839.

R. D. Sydansk, A New Conformance-Improvement--Treatment Chromium (III)Gel Technology, SPE/DOE 17329, presented at SPE/DOE Enhanced Oil Recovery Symposium, Tulsa, OK, Apr. 17–20, 1988.

R. D. Sydansk et al, Field Testing of a New Conformance-Improvement-Treatment Chromium (III) Gel Technology, SPE/DOE 17383, presented at SPE/DOE Enhanced Oil Recovery Symposium, Tulsa, OK, Apr. 17–20, 1988.

*Primary Examiner*—Ramon S. Britts
*Assistant Examiner*—Roger J. Schoeppel
*Attorney, Agent, or Firm*—Jack L. Hummel; Jack E. Ebel

[57] ABSTRACT

A nonflowing crosslinked polymer gel is employed as a well kill material in a process for preventing or minimizing the intrusion of formation fluid into a wellbore while preventing or minimizing wellbore fluid leakoff in the formation during conventional oil field wellbore operations in the wellbore. The gel comprises an an carboxylate-containing polymer and a chromic carboxylate crosslinking agent.

21 Claims, No Drawings

WELL KILL TREATMENT FOR OIL FIELD WELLBORE OPERATIONS

This is a continuation-in-part patent application of copending U.S. patent application Ser. No. 380,057, filed on July 14, 1989.

BACKGROUND OF THE INVENTION

1. Technical Field

The invention relates to hydrocarbon recovery from a subterranean hydrocarbon-bearing formation.

1. Background Information

Kill fluids are commonly placed in a wellbore during oil field wellbore operations, including drilling, wellbore completions, and workovers, to kill the well, i.e., prevent the intrusion of formation fluids into the wellbore while the well is open. The kill fluid is often maintained in the wellbore for the entire duration of the operation.

Conventional kill fluids known in the art are typically aqueous liquids, which contain a weighting agent, such as inert inorganic solids in solution or suspension, to increase the density of the fluid. The weighted kill fluid applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given oil field wellbore operation which is necessary from an operational standpoint to prevent interference from formation fluids and which is also necessary from a safety standpoint. Maintenance of a sufficient hydrostatic pressure in the wellbore reduces the potential of a well kick or blow out.

Thickeners are often included in weighted kill fluids known in the art for leakoff inhibition. See, for example, Hudson et al, SPE Paper No. 10652, which discloses a weighted brine containing a fluid loss control agent, or U.S. Pat. No. 4,391,925 to Mintz et al, which discloses a multi-phase kill fluid comprising a number of constituents including a hydrocarbon, a surfactant, a clay and an organic polymer. Advantageous kill fluids are those which prevent formation fluid intrusion into the wellbore while preventing appreciable wellbore fluid leakoff into the formation. Fluid leakoff can undesirably result in formation damage, i.e., permeability reduction, which is manifested in reduced hydrocarbon recovery from the formation or reduced injectivity into the formation.

Under downhole conditions where the wellbore is in direct communication with voids, it can be extremely difficult to prevent fluid leakoff. Conventional kill fluids generally do not exhibit sufficient flow resistance to prevent them from escaping the wellbore into the formation matrix via the high permeability voids. Such leakoff can ultimately result in loss of the hydrostatic pressure overbalance which enables formation fluids to intrude into the wellbore, negating the primary function of the kill treatment. Although it is possible to maintain the hydrostatic pressure overbalance in the face of severe fluid leakoff by replenishing the lost kill fluid, this practice can be cost prohibitive.

It is apparent that the utility of kill fluids is limited, particularly in the presence of voids in direct communication with the wellbore. Thus, a need exists for a kill treatment having utility in hydrocarbon recovery operations over a broad range of operating conditions, and particularly having utility when kill fluids are ineffective. Specifically, a need exists for a kill treatment, which is effective when severe voids in direct communication with the wellbore are present. A kill treatment is needed which prevents or minimizes the intrusion of formation fluids into the wellbore and prevents or minimizes the significant leakoff of wellbore fluid from the wellbore in the presence of such voids.

SUMMARY OF THE INVENTION

The present invention is a process employing a material which prevents or minimizes the substantial flow of formation fluids into the wellbore during the performance of conventional oil field wellbore operations, such as drilling, completions, or workovers, while simultaneously preventing or minimizing the leakoff of wellbore fluids into the formation matrix. The material employed in the present process is a continuous, nonflowing, crosslinked, water-soluble, polymer gel.

The utility of the present process in oil field wellbore operations is attributable to the specific composition of the gel. The polymer gel composition utilized in the present process comprises a carboxylate-containing polymer, a chromic carboxylate complex crosslinking agent and an aqueous solvent. The gel constituents are premixed at the surface to form a flowing composition. When placed in a wellbore, the composition gels to completion forming a nonflowing gel which is sufficiently strong to effectively prevent or minimize fluid intrusion into the wellbore, even under high formation fluid pressures and sufficiently strong to effectively prevent or minimize excessive leakoff of the gel out of the wellbore, even in the presence of significant voids in direct communication with the wellbore. The gel is nondamaging to the formation and residual gel remaining in the wellbore is generally reversible if desired.

The gel employed in the present invention has utility over a broad range of operating conditions. The gel is effective in the presence of high salt concentration brines and is resistant to thermal degradation at temperatures generally encountered during oil field wellbore operations. Furthermore, the gel can be formulated over a very broad range of gel strengths. Nevertheless, the gel is relatively insensitive to minor variations in conditions under which it is formulated. Thus, the gel is readily suited for on-site preparation in the field where process controls are often imprecise, such as remote hostile onshore and offshore locations.

In addition to the above-recited operational advantages, the gel employed in the present invention can offer practical advantages over kill fluids known in the art. The present process is cost effective because the gel components are readily available and relatively inexpensive. The gel can be prepared and applied with conventional oil field equipment. Finally, the gel composition is relatively nontoxic in the environment and safe to handle.

Gels compositionally related to those used in the process of the present invention have known utility in conformance improvement treatment (CIT) processes as shown in U.S. Pat. Nos. 4,683,949 and 4,744,499 to Sydansk et al, which are incorporated herein by reference. However, the performance requirements for kill treatments can be very different from those for CIT processes. CIT processes are generally employed during the hydrocarbon production phase of a wellbore while kill treatments are generally employed during a preproduction phase or production interruption phase of a wellbore where dynamic stresses on the gel can be much greater.

The composition and resulting properties of the gel used in a kill treatment must be specific to the requirements of the wellbore operation being performed. Unlike a CIT gel, a kill treatment must employ a gel having sufficient strength and integrity to control fluid intrusion and leakoff under stressful conditions, yet allow concurrent performance of dynamic wellbore operations without substantial interference. Thus, the present invention fills a need in the art for a process which utilizes a polymer gel composition satisfying these parameters.

DESCRIPTION OF PREFERRED EMBODIMENTS

The present invention is a process which may be performed in conjunction with any wellbore operation, but which is particularly applicable to oil field wellbore operations, including drilling, completions, and workovers performed in accordance with methods known to those skilled in the art. It is understood that the term "oil field" relates to all forms of hydrocarbons.

In a preferred embodiment, the process of the present invention is initiated by formulating a flowing polymer gel composition at the surface and placing the composition in a wellbore penetrating a subterranean hydrocarbon-bearing formation prior to or during performance of the oil field wellbore operation. The composition sets up in the wellbore and any voids in direct communication with the wellbore to form a nonflowing polymer gel. The presence of the gel in the wellbore and adjacent voids enables one to maintain the well uncapped and completely open to the surface during the performance of the operation if desired.

The term "crosslinked polymer gel" as used herein is directed to a continuous three-dimensional crosslinked polymeric network having a high molecular weight. The polymer network is the result of crosslinking one or more polymer molecules. Crosslinking is the bonding of functional groups on the same or different polymer molecules to one another. The crosslinked gel has a liquid medium such as water which is contained within a solid polymeric network. The unique containment of the liquid medium in the polymer network provides a gel upon complete gelation which is characterized as "nonflowing".

Nonflowing gels do not fully conform to the shape of their container, but may deform somewhat under the force of gravity. In contrast flowing gels fully conform to the shape of their containers. Nonflowing gels range in properties from highly deformable or elastic gels to rigid or ringing gels.

The gel composition used in the present process comprises a polymer, a crosslinking agent and an aqueous solvent. The polymer is a carboxylate-containing polymer which is a crosslinkable water-soluble polymer having one or more carboxylate groups or, alternatively, having one or more groups capable of being hydrolyzed to carboxylate groups (e.g., amide groups). The carboxylate-containing polymer satisfying these criteria may be either a synthetic polymer or a biopolymer. The average molecular weight of the polymer is in the range of about 10,000 to about 50,000,000, preferably about 100,000 to about 20,000,000 and most preferably about 150,000 to about 15,000,000.

The preferred polymer of the present invention is an acrylamide polymer, which is defined herein as a crosslinkable, water-soluble, synthetic polymer containing one or more acrylamide groups. Useful acrylamide polymers include polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in a carboxylate form. Partially hydrolyzed polyacrylamide (PHPA) is an acrylamide polymer having at least 1%, but not 100%, of the acrylamide groups in a carboxylate form. The acrylamide polymer may be prepared according to any conventional method known in the art, but preferably has the specific properties of an acylamide polymer prepared according to the method disclosed by U.S. Pat. No. Re. 32,114 to Argabright et al incorporated herein by reference.

The crosslinking agent of the present invention is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{1+}$;
$[Cr_3(OH)_2(CH_3CO_2)_6]NO_3.6H_2O$;
$[Cr_3(H_2O)_2(CH_3CO_2)_6]^{3+}$;
$[Cr_3(H_2O)_2(CH_3CO_2)_6](CH_3CO_2)_3. H_2O$;
etc.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, *Journal of the Society of Leather Trades' Chemists.* "The Kinetics of Chrome Tannage Part I.," United Kingdom, 1965, v. 49, p. 133–154; "Part III.," United Kingdom, 1965, v. 49, p.

251–260; "Part IV.," United Kingdom, 1965, v. 49, p. 261–268; and Von Erdman, *Das Leder,* "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., *Chromium. Volume* 1: *Chemistry of Chromium and its Compounds.* Reinhold Publishing Corp., N.Y., 1956, pp. 229–233; and Cotton and Wilkinson, *Advanced Inorganic Chemistry 3rd Ed.,* John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., $CrCl_3$, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The gel is formed by admixing the polymer, the crosslinking agent and aqueous solvent at the surface. Surface admixing broadly encompasses inter alia mixing the gel components in bulk at the surface prior to injection or simultaneously mixing the components at or near the wellhead by in-line mixing means while injecting them.

Admixing is accomplished, for example, by dissolving the starting materials for the crosslinking agent in an appropriate aqueous solvent. Exemplary starting materials include solid $CrAc_3 \cdot H_2O$, solid $Crhd\ 3Ac_7(OH)_2$, or a solution labeled "Chromic Acetate 50% Solution" commercially available from McGean-Rohco Chemical Co., Inc., 1250 Terminal Tower, Cleveland, Ohio 44113, U.S.A. The crosslinking agent solution is then mixed with an aqueous polymer solution to produce the gel. Among other alternatives, the starting materials for the crosslinking agent can be dissolved directly in the aqueous polymer solution to form the gel in a single step.

The present process enables the practitioner to customize or tailor-make a gel having a predetermined gelation rate and predetermined gel properties of strength and thermal stability from the above-described composition. The gelation rate is defined as the degree of gel formation as a function of time or, synonymously, the rate of crosslinking in the gel. The degree of crosslinking may be quantified in terms of several variables including gel viscosity, strength and plugging efficiency. Gel strength of a nonflowing gel is defined as the resistance of the gel to deformation or fracturing. Thermal stability is the ability of a gel to withstand temperature extremes without degradation.

Tailor-making or customizing a gel in the manner of the present invention to meet the performance requirements of a particular oil field wellbore operation is provided in part by correlating the independent gelation parameters with the dependent variable of gelation rate and resultant gel strength and stability. The independent gelation parameters are the surface and in situ gelation conditions including: temperature, pH of the crosslinking agent and polymer solutions, ionic strength and specific electrolytic makeup of the aqueous solvent, polymer concentration, ratio of the weight of polymer to the combined weight of chromium III and carboxylate species in the mixture, molar ratio of carboxylate species to chromium III, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, yield stress testing, filtration tests and core flooding experiments. The operable ranges of a number of gelation parameters and their correlation with the dependent variables are described below.

The lower temperature limit of the gel at the surface is its freezing point and the upper limit is essentially the thermal stability limit of the polymer. The gel is generally maintained at ambient temperature or higher at the surface. The temperature may be adjusted by heating or cooling the aqueous solvent. Increasing the temperature within the prescribed range increases the gelation rate.

The initial pH of the gel is within a range of about 3 to 13 and preferably about 6 to 13. Although gelation can occur at an acidic pH, lowering the initial pH below 7.0 does not favor gelation. The initial pH is most preferably alkaline, i.e., greater than 7 to about 13. When the polymer is PHPA, increasing the pH within the prescribed range increases the rate of gelation.

The polymer concentration in the gel is about 500 ppm up to the solubility limit of the polymer in the solvent or the rheological constraints of the polymer solution, preferably about 750 to about 200,000 ppm, and most preferably about 1000 to about 50,000 ppm. Increasing the polymer concentration increases the gelation rate and ultimate gel strength at a constant ratio of polymer to crosslinking agent.

The ionic strength of the aqueous solvent can be from that of deionized distilled water to that of a brine having an ion concentration approaching the solubility limit of the brine. Generally, fresh water has a total dissolved solids concentration below about 500 ppm and a produced brine has a total dissolved solids concentration above about 500 ppm. Thus, fresh water and produced brines fall within the useful range of the present invention. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis for an acrylamide polymer is about 0 to 60% and preferably about 0 to 30%. Within the preferred range, increasing the degree of hydrolysis in most cases increases the gelation rate. Increasing the molecular weight of the polymer increases the gel strength.

It is apparent from these correlations that one can produce gels across a very broad range of gelation rates and gel properties as a function of the gelation conditions. Thus, to produce an optimum gel according to the present process, the practitioner predetermines the gelation rate and properties of the resultant gel which meet the performance requirements of a given situation and thereafter produces a nonflowing gel having these predetermined characteristics. The performance requirements generally include in situ wellbore conditions, such as temperature, formation geology, and formation fluid pressure. Other performance requirements can include operational conditions. Analytical methods known to one skilled in the art are used to determine the performance requirements.

The gel employed in the kill treatment of the present process should have sufficient strength when it sets up at the wellbore face to substantially reduce or eliminate the volumetric flow of formation fluid into the wellbore while the gel does not substantially leak off into the formation matrix. By "substantially reduce" it is meant that the volumetric flow of formation fluid into the wellbore prior to placement of the gel therein is greater than the volumetric flow after placement of the gel. To satisfy this requirement the strength of the gel should be sufficient to withstand the formation fluid pressure and the hydrostatic overbalance pressure without substantially deforming or fracturing. The formation fluid pressure is in many cases about equal to the hydrostatic head of a column of formation fluid wherein the column is equal in height to the formation depth at the point where fluid flows into the wellbore. The gel must also have sufficient strength to prevent or minimize leakoff of wellbore fluids into the formation throughout the oil field wellbore operation.

The strength of the gel can be augmented at the practitioner's option by the addition of inert solids suspended or dispersed in the gel. Exemplary inert solids include, crushed rock, glass beads, plastic or cellulosic fibers and the like.

Once the gel is formulated, it is injected into the wellbore as a partial flowing gel. The well is killed by placing the partial flowing gel at faces across which formation fluid enters the wellbore. Placement of the partial gel at the faces can be facilitated by the use of mechanical zone isolation packers if desired. Within a predetermined time period complete gelation occurs and the gel sets up as a nonflowing gel, which substantially prevents or reduces the flow of formation fluids into the wellbore.

A "partial gel" as referred to herein has at least one chemically crosslinked site. The partial gel may or may not manifest the physical properties of a crosslinked gel, but the partial gel is capable of further crosslinking to completion in situ, resulting in a gel having the desired properties without the addition of more crosslinking agent. The partial gel preferably has sufficient viscosity and/or plugging efficiency to substantially prevent or reduce gel leakoff into the formation during or subsequent to its placement.

"Complete gelation" means that the gel composition is nonflowing and is incapable of further crosslinking because one or both of the required reactants in the initial solution are consumed. Further crosslinking is only possible if either more polymer, crosslinking agent, or both are added to the gel composition.

The volume of gel injected into the wellbore is an amount which is at least sufficient to cover the faces across which the formation fluid enters the wellbore. Thus, the volume required is a function of the wellbore configuration and the adjacent formation. If the wellbore is a uniform borehole free of adjacent voids, a relatively small volume of gel will be required to kill the well. However, if the borehole is irregular with many voids in direct communication therewith, much larger volumes of gel may be required to kill the well. In any case the present process has utility in both cased and uncased wellbores depending on the particular operation it is complimenting.

It is believed that the gel functions in the kill treatment of the present invention by coating faces and at least partially, if not entirely, filling voids, if any are present, which are in direct communication with the wellbore. In so doing, the gel plugs the faces, thereby preventing the flow of fluids across them and out of the wellbore or voids. The gel also prevents the leakoff of wellbore fluids through the wellbore or voids into the formation matrix. Although it is not always possible, it is preferable that the gel as used in the present invention fills and plugs the voids proximal the wellbore first, which blocks flow into and out of voids remote from the wellbore. This obviates the need to fill and plug remote voids, thereby advantageously limiting the required volume of treatment material to practice the present invention.

The following definitions apply to the present invention. "Plugging" is a substantial reduction in permeability. The term "face" is the interface between a wellbore or void and the formation matrix, i.e., the walls of the wellbore or the walls or boundaries of voids in direct communication with the wellbore. The "wellbore" is the bore hole formed by the drill bit in the formation. "Voids" are not formed by the drill bit, but are nevertheless anomalies having a permeability substantially equal to that of the bore hole relative to that of the matrix. Voids include fractures, fracture networks, caverns, vugs, cavities, washouts, cobble packs, unconsolidated sands, and the like, which may be proximal or which may extend far away from the wellbore. The "matrix" is homogeneous, continuous, sedimentary material having a permeability, which is substantially less than that of the wellbore or voids. "Direct communication" means that the voids are not separated from the wellbore by intervening matrix.

After the oil field wellbore operation is completed, the well may be utilized for its intended purpose, i.e., recovery of hydrocarbon fluids from the formation or injection of fluids into the formation. Since the gel does not significantly penetrate the formation matrix beyond about 1 cm from the wellbore face, the gel is nondamaging to the formation matrix to the extent that it does not substantially inhibit subsequent flow of fluids into or out of the wellbore after it is removed therefrom. Even if the gel unacceptably inhibits the flow of fluids, the problem can be remedied by perforating the matrix beyond the layer of gel penetration.

The present invention can be practiced using the gel as a primary treatment material according to the manner set forth above. In another embodiment of the invention, the gel is employed in a remedial role after the failure of a conventional well kill treatment. If one has attempted to kill a well using large volumes of a conventional material, such as a heavy brine containing a water-soluble uncrosslinked biopolymer, with little apparent success, the conventional treatment is terminated and the treatment process of the present invention is performed in the manner described above to effectively kill the well. In any case the treatment of the present invention is most preferred for killing wells having significant voids in direct communication with the wellbore, which would cause, or already have caused, significant leakoff of conventional kill fluids from the wellbore into the formation matrix.

The gel used in the present invention is generally maintained in the wellbore throughout the performance of the oil field wellbore operation. The gel should be placed such that it enables one to perform the desired operation in the wellbore without substantially interfering with the operation. Once the oil field wellbore operation is completed, it is usual to begin or resume injection of fluids into the formation or production of formation fluids from the wellbore, depending on whether the wellbore is an injection or production wellbore. In most cases it is desirable to remove the gel from the wellbore before injecting or producing fluids. The gel may be removed by drilling it out or any other conventional means.

Since the gels employed in the process of the present invention are generally reversible, removal of residual gel from the wellbore after the completion of a particular wellbore operation can also be accomplished by reversing the gel with a conventional breaker, such as peroxides, hypochlorites or persulfates. The breaker can be incorporated into the initial gel composition at the surface to slowly break the gel over time or the breaker can be placed in the wellbore separately to reverse the gel on contact at the desired time after completion of the wellbore operation.

The following examples demonstrate the practice and utility of the present invention, but are not to be construed as limiting the scope thereof.

The following table is useful in interpreting the qualitative data set forth in the examples below. Gels A-E are flowing gels and gels F-J are nonflowing gels.

| Code | Gel Strength Code |
|---|---|
| A | No detectable gel formed: the gel appears to have the same viscosity as the original polymer solution and the gel is not visually detectable. |
| B | Highly flowing gel: the gel appears to be only slightly more viscous than the initial polymer solution. |
| C | Flowing gel: almost all of the detectable gel flows to the bottle cap upon inversion. |
| D | Moderately flowing gel: most of the gel flows to the bottle cap upon inversion but a portion does not (about 5 to 15%); this gel is often characterized as a "tonguing" gel. |
| E | Barely flowing gel: the gel barely flows to the bottle cap or a significant portion (>15%) of the gel does not flow upon inversion. |
| F | Highly deformable nonflowing gel: the gel deforms but does not reach all the way to the bottle cap upon inversion. |
| G | Moderately deformable nonflowing gel: the gel deforms only about half way down the bottle upon inversion. |
| H | Slightly deformable nonflowing gel: the gel surface only slightly deforms upon inversion. |
| I | Rigid gel: the gel surface does not deform upon inversion. |
| J | Ringing rigid gel: a mechanical vibration like a tuning fork can be felt after tapping the bottle. |

The polymer solutions of Examples 1-5 are prepared by combining an acrylamide polymer solution with a crosslinking agent solution in a 0.12 liter wide mouth bottle to form a 0.05 liter sample. The sample is gelled in the capped bottle and the qualitative gel strength is determined by periodically inverting the bottle.

The following conditions apply to all of the examples, unless stated otherwise. The acrylamide polymer is partially hydrolyzed polyacrylamide (PHPA), which is 30% hydrolyzed. The crosslinking agent solution is a complex or mixture of complexes comprising chromium III and acetate ions prepared by dissolving solid $CrAc_3 \cdot H_2O$ or $CrAc_7(OH)_2$ in water or diluting a solution obtained commercially under the label of "Chromic Acetate 50% Solution". The aqueous solvent is Denver, Colo. U.S.A. tap water.

EXAMPLE 1

The PHPA has a molecular weight of 11,000,000 and the aqueous solvent is an NaCl brine having a concentration of 5,000 ppm. The pH of the gelatin solution is 8.6, the temperature is 22° C. and the ratio of PHPA to chromium III is 44:1. The data table below shows that the gel strength can be varied by varying the polymer concentration in the gelation solution while holding the ratio of polymer to crosslinking agent constant.

TABLE 1

| | Run No. | | | |
|---|---|---|---|---|
| | 1 | 2 | 3 | 4 |
| | ppm PHPA | | | |
| | 20,000 | 15,000 | 10,000 | 7,500 |
| | ppm $Cr^{III}$ | | | |
| | 454 | 341 | 227 | 170 |
| Time (hr) | Gel Code | | | |
| 1.0 | E | D | C | B |
| 2.0 | H | E | C | B |
| 3.0 | H | E | C | B |
| 4.0 | H | E | C | B |
| 5.0 | H | F | C | C |
| 6.0 | H | G | C | C |
| 24 | H | H | E | D |
| 48 | I | I | F | E |
| 72 | I | I | G | F |
| 96 | I | I | G | F |
| 168 | J | J | H | F |
| 300 | J | J | H | F |
| 600 | J | J | H | F |
| 1200 | J | J | H | F |
| 2400 | J | J | H | F |

EXAMPLE 2

The PHPA has a molecular weight of 5,000,000 and has a concentration of 8400 ppm in the gelation solution. The aqueous solvent is an NaCl brine having a concentration of 5000 ppm. The temperature is 22° C. and the ratio of PHPA to chromium III is 40:1. The data table below shows that the gelation rate can be varied as a function of pH.

TABLE 2

| | Polymer Solution pH | | | | |
|---|---|---|---|---|---|
| | 10.6 | 8.0 | 7.0 | 6.0 | 4.0 |
| Time (hr) | Gel Code | | | | |
| 0.5 | A | A | A | A | A |
| 1.0 | A | A | A | A | A |
| 1.5 | A | A | A | A | A |
| 2.0 | B | A | A | A | A |
| 2.5 | B | A | A | A | A |
| 4.0 | B | B | A | A | A |
| 5.0 | C | B | A | A | A |
| 6.0 | C | B | B | A | A |
| 7.0 | C | B | B | B | A |
| 8.0 | C | C | B | B | B |
| 24 | E | C | C | B | B |
| 28 | E | C | C | C | C |
| 48 | E | D | C | C | C |
| 80 | G | E | C | C | C |
| 168 | H | F | D | D | D |
| 600 | H | F | D | D | E |
| 2040 | H | G | F | F | G |

EXAMPLE 3

A series of gels are prepared under the same conditions as Example 2, but at a neutral pH of 7. Common oil field salts are added to the gelation solutions during formulation. The data table below shows that gels can be formed which are relatively insensitive to a number of common oil field salts.

TABLE 3

| Time (hr) | Run No. | | | | | | |
|---|---|---|---|---|---|---|---|
| | 1 | 2 | 3 | 4 | 5 | 6 | 7 |
| | | | | Salt | | | |
| | none (control) | $CaCl_2$ | $Na_2SO_4$ | $NH_4Cl$ | KCl | $NaHCO_3$ | $Na_2CO_3$ |
| | | | | ppm Salt | | | |
| | — | 1000 | 3000 | 100 | 400 | 2000 | 100 |
| | | | | Gel Code | | | |
| 1.0 | A | A | A | A | A | A | A |
| 4.0 | A | A | A | A | A | A | A |
| 5.0 | B | B | B | B | B | B | B |
| 6.0 | B | B | B | B | B | B | B |
| 7.0 | B | B | B | B | B | B | B |
| 8.0 | C | C | C | C | C | B | B |
| 24 | C | C | C | C | C | C | C |
| 72 | D | D | D | D | D | D | D |
| 120 | E | E | E | D | D | E | E |
| 264 | E | F | F | F | F | F | F |
| 288 | E | F | F | F | F | F | F |
| 408 | E | F | F | F | F | F | F |

EXAMPLE 4

The PHPA has a molecular weight of 11,000,000 and has a concentration of 8,000 ppm. The ratio of polymer to crosslinking agent is 66:1 and the chromium III concentration is 121 ppm. The aqueous solvent is a synthetic oil field brine at a pH of 7.5 and a temperature of 22° C. The composition of the synthetic brine is set forth below. The data table below shows that utilitarian gels can be formed in oil field brines.

TABLE 4

| Time (hr) | Gel Code |
|---|---|
| 0.25 | A |
| 0.5 | B |
| 4.0 | B |
| 5.0 | C |
| 6.0 | C |
| 7.0 | D |
| 24 | D |
| 96 | G |
| 150 | G |
| 197 | H |
| 936 | H |

| Synthetic Brine Composition | |
|---|---|
| | g/l |
| $Na_2CO_3$ | 0.249 |
| $NH_4Cl$ | 0.086 |
| $CaCl_2$ | 0.821 |
| $MgCl_2.6H_2O$ | 1.78 |
| $Na_2SO_4$ | 1.09 |
| NaCl | 6.89 |

EXAMPLE 5

The PHPA has a molecular weight of 5,000,000 and has a concentration of 8000 ppm. The ratio of polymer to crosslinking agent is 88:1 and the chromium III concentration is 91 ppm. The aqueous solvent is an oil field brine having an $H_2S$ concentration greater than 100 ppm and a total dissolved solids concentration of 0.33% by weight. The composition of the solvent is shown below. The pH of the gelatin solution is 9.0 and the temperature is 60° C. The data table below shows that utilitarian gels can be formed in the presence of $H_2S$ and at an elevated temperature.

TABLE 5

| Time (hr) | Gel Code |
|---|---|
| 0.5 | A |
| 1.0 | C |
| 1.5 | D |
| 2.0 | E |
| 3.0 | F |
| 4.0 | F |
| 5.0 | F |
| 7.0 | F |
| 12 | F |
| 27 | F |
| 75 | F |
| 173 | F |
| 269 | F |
| 605 | F |

| Synthetic Brine Composition | |
|---|---|
| | ppm |
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

EXAMPLE 6

A gelation solution is prepared wherein the PHPA has a molecular weight of 5,000,000 and the aqueous solvent is an NaCl brine having a concentration of 3,000 ppm. The concentration of PHPA in the gelatin solution is 5,000 ppm, the pH of the gelation solution is 10.2, the temperature is 105° F. and the ratio of PHPA to chromium III is 32:1. The gelation solution is aged for one hour after mixing at which time no gel is visually detected by bottle testing. 50 cm³ of gel sample is placed in a Millipore filter holder. A pressure of 50 psi is applied to the gel in an effort to drive the gel through an 8 micron cellulose-acetate Millipore filter having a 47 mm diameter. Only 0.8 cm³ of gelation solution passes through the filter after 10 minutes of applied pressure. An entire 50 cm³ of polymer solution without crosslinking agent passes through the filter in 2.6 minutes under identical experimental conditions.

The results show that the gelation solution is sufficiently crosslinked after only one hour of aging to render it essentially unfilterable. Likewise a gelation solution that cannot pass through an 8 micron filter would not be expected to significantly permeate competent formation matrix rock having a permeability less than 1000 md. Thus, the gel of the present invention sets up at the wellbore face without substantially penetrating the matrix.

EXAMPLE 7

A mature gel is prepared by crosslinking PHPA with a chromic acetate complex. The PHPA has a molecular weight of 11,000,000 and is diluted to a concentration of 5000 ppm in a synthetic injection water. About 0.5 l of the gel is injected for 14 hours across the face of a 35 md Mid Continent Field carbonate core plug while a 42 psi differential pressure is applied to the length of the plug. The core plug is 2.7 cm long and has a diameter of 2.5 cm. A clear filtrate having essentially the viscosity of water is produced from the core plug.

After gel injection, the core plug is flooded for two days with about 8 pore volumes of brine until the permeability of the core plug stabilizes at 4.1 microdarcies ($k_{final}/k_{initial}=0.00012$). Thereafter, the first 4 mm of core material from the injection face are cut away from the core. The permeability of the remaining plug slightly exceeds the initial permeability of the plug (35 md).

The results indicate that permeability reduction is confined to the core material in the first 4 mm from the injection face. Thus, the gel does not substantially invade formation rock and does not cause permeability reduction in the matrix a significant distance from the wellbore face before setting up.

EXAMPLE 8

A gel is prepared by mixing polyacrylamide with a chromic acetate complex in solution. The polyacrylamide has a molecular weight of 11,000,000, the concentration of polyacrylamide in the gelation solution is 22,000 ppm, the weight ratio of polyacrylamide to chromium III is 80:1, and the aqueous solvent is fresh water. The gelation solution is initially aged at 60° C. The mature gel does not flow through a 1.5 mm inside diameter orifice during five days at an applied pressure of 3450 kPa and a temperature of 124° C., which is a relatively high oil-bearing formation temperature. The same test is repeated at temperatures down to 22° C. with comparable results. Thus, it is concluded that the yield pressure of the mature gel into the orifice exceeds 3450 kPa within a temperature range of 22° C. to 124° C.

EXAMPLE 9

A weighted gel is prepared by mixing polyacrylamide with a chromic acetate complex in solution. The polyacrylamide has a molecular weight of 11,000,000, the ratio of polyacrylamide to chromium III is 88:1 and the gelation solution temperature is 22° C. The data table below shows that weighted gels can be formulated in high salt concentration brines, which have densities significantly greater than the density of unweighted gels, yet which have substantially the same properties as unweighted gels in all other respects.

TABLE 9

| | ppm NaCl | | | |
|---|---|---|---|---|
| | 0 | 100,000 | 0 | 100,000 |
| | | Specific Gravity | | |
| | 1.00 | 1.07 | 1.00 | 1.07 |
| | ppm PHPA | | | |
| | 20,000 | 20,000 | 30,000 | 30,000 |
| Time (hr) | | Gel Code | | |
| 1.0 | A | C | D | F |
| 2.0 | C | D | G | G |
| 4.0 | D | D | I | I |
| 7.0 | E | E | I | I |
| 24 | H | H | I | I |
| 48 | I | H | I | J |
| 96 | I | I | J | J |
| 168 | J | I | J | J |
| 300 | J | J | J | J |
| 800 | J | J | J | J |
| 2800 | J | J | J | J |

EXAMPLE 10

A well is producing fluids at a rate of 43 barrels of oil per day and 444 barrels of water per day from a Mid-Continent carbonate formation which is highly vugular and somewhat fractured. The formation temperature is 83° F. and the producing zone is at a depth of 367 meters with 3 meters of perforations. The production tubing is 7.3 cm inside diameter.

A weighted kill material is prepared by placing PHPA in a 4.2% by weight sodium chloride solution to form 1.7% by weight polymer solution. The PHPA is 2.7% hydrolyzed and has a molecular weight of 11,000,000. An internal breaker is added to the polymer solution comprising 12,000 ppm ammonium persulfate and 100 ppm hydrogen peroxide. Thereafter, a crosslinking agent is added to the solution comprising 90% by weight chromic acetate and 10% by weight chromic chloride to form a flowing partial gel. The weight ratio of polymer to crosslinking agent in the partial gel is 20:1.

The well is killed by injecting 45 barrels of the partial gel into the wellbore. Approximately one hour after injection the partial gel sets up as the well kill material, i.e., a nonflowing gel. Thereafter, the gel is allowed to mature in the wellbore an additional seven hours. At the end of this period the surface wellhead is disconnected and the surface wellhead equipment is repaired over the next six hours. After completion of the repairs, the well is shut in for 27 days to conduct interference testing.

The gel maintains its full strength in the wellbore for the first 24 hours after injection, which is more than sufficient time to conduct the wellhead repairs. After 24 hours the gel begins to break down and after 300 hours the viscosity of the broken gel is indistinguishable from the initial sodium chloride solution.

Upon completion of the interference testing, the well is put back on production. Initial production rates are 51 barrels of oil per day and 490 barrels of water per day. After 30 days of production the production rates are 41 barrels of oil per day and 449 barrels of water per day.

While the foregoing preferred embodiments of the invention have been described and shown, it is understood that alternatives and modifications, such as those suggested and others, may be made thereto and fall within the scope of the invention.

I claim:

1. A process of killing a well to substantially reduce volumetric flow of a formation fluid across a wellbore face into a wellbore penetrating a formation having a formation matrix and containing said formation fluid below an earthen surface, comprising:

admixing components of a continuous nonflowing gel at said surface to form a partial flowing gel comprising a water-soluble carboxylate-containing polymer, a complex capable of crosslinking said polymer and formed of at least one electropositive chromium III species and at least one electronegative carboxylate species, and an aqueous solvent for said polymer and said complex;

placing said partial gel in said wellbore at said wellbore face, said partial gel which is placed at said wellbore face does not significantly penetrate the formation matrix;

forming said nonflowing gel from said partial gel in said wellbore at said wellbore face to substantially reduce said volumetric flow of said formation fluid across said wellbore face into said wellbore, thereby killing said well; an removing substantially all of said nonflowing gel from said wellbore face to substantially restore the volumetric flow of said formation fluid into said wellbore.

2. The process of claim 1 wherein said complex is additionally formed of at least one species selected from the group consisting of electronegative oxygen species, electronegative hydroxide species, inorganic monovalent ions, inorganic divalent ions, water molecules and mixtures thereof.

3. The process of claim 1 wherein said partial flowing gel further comprises an inert solid.

4. The process of claim 1 wherein said nonflowing gel is formed in said wellbore by crosslinking said polymer and said complex substantially to completion at said wellbore face.

5. The process of claim 1 wherein said partial and nonflowing gels do not substantially leak off out of said wellbore into said formation matrix.

6. The process of claim 1 wherein said carboxylate-containing polymer is an acrylamide polymer.

7. The process of claim 1 wherein said carboxylate-containing polymer is selected from the group consisting of polyacrylamide and partially hydrolyzed polyacrylamide.

8. The process of claim 1 wherein said at least one electronegative carboxylate species is acetate.

9. The process of claim 1 wherein said formation fluid is a hydrocarbon and said wellbore is a hydrocarbon production wellbore for producing said hydrocarbon from said formation to said earthen surface.

10. The process of claim 1 wherein said wellbore is a fluid injection wellbore for injecting an injection fluid into said formation to facilitate the recovery of a hydrocarbon from said formation.

11. The process of claim 1 wherein said wellbore is cased.

12. The process of claim 1 wherein said wellbore is uncased.

13. The process of claim 9 further comprising:
performing an oil field wellbore operation in said wellbore after forming said nonflowing gel at said wellbore face and before removing substantially all of said nonflowing gel from said wellbore face after completing said operation; and producing said hydrocarbon from said wellbore after removing substantially all of said nonflowing gel from said wellbore face.

14. The process of claim 10 further comprising:
performing an oil field wellbore operation in said wellbore after forming said nonflowing gel at said wellbore face and before removing substantially all of said nonflowing gel from said wellbore face after completing said operation; and injecting said injection fluid into said wellbore after removing substantially all of said nonflowing gel from said wellbore face.

15. The process of claim 1 further comprising reversing said nonflowing gel with a breaker before removing said nonflowing gel from said wellbore.

16. The process of claim 1 further comprising placing said partial gel in a subterranean void in direct communication with said wellbore and forming said nonflowing gel from said partial gel in said void to substantially reduce the volumetric flow of the formation fluid through said void into said wellbore.

17. The process of claim 16 wherein said partial and nonflowing gels do not substantially leak off out of said void.

18. The process of claim 16 wherein said void is proximal said wellbore.

19. A process of killing a well to substantially reduce the volumetric flow of a formation fluid across a wellbore face into a wellbore penetrating a formation having a formation matrix and containing said formation fluid below an earthen surface without significantly leaking off gels place in said wellbore for a time sufficient to perform an oil field wellbore operation in said wellbore, the process comprising:

admixing components of a continuous nonflowing gel at said surface to form a partial flowing gel comprising a water-soluble acrylamide polymer an chromic acetate complex;

placing said partial gel in said wellbore at said wellbore face, said partial gel which is placed at said wellbore face does not significantly penetrate the formation matrix;

forming said nonflowing gel from said partial gel in said wellbore at said wellbore face to substantially reduce said volumetric flow of said formation fluid across said wellbore face into said wellbore without said partial and nonflowing gels substantially leaking off out of said wellbore into said formation matrix;

performing said oil field wellbore operation in said wellbore; and removing said nonflowing gel from said wellbore face.

20. The process of claim 19 further comprising placing said partial gel in a subterranean void in direct communication with said wellbore and forming said nonflowing gel from said partial gel in said void to substantially reduce said volumetric flow of said formation fluid through said void into said wellbore and without said partial and nonflowing gel substantially leaking off out of said void into said formation away from said wellbore.

21. The process of claim 20 wherein said void is proximal said wellbore.

* * * * *

UNITED STATES PATENT AND TRADEMARK OFFICE
CERTIFICATE OF CORRECTION

PATENT NO. : 4,995,461

DATED : February 26, 1991

INVENTOR(S) : Robert D. Sydansk

It is certified that error appears in the above-identified patent and that said Letters Patent is hereby corrected as shown below:

| | |
|---|---|
| Col. 5, line 25: | After "is", insert --in the--. |
| Col. 5, line 37: | Delete "Crhd 3Ac7." and insert therefor -- $Cr_3 Ac_7$- --. |
| Col. 15, line 20: | Delete "an" and insert therefor --and--. |
| Col. 16, line 32: | Delete "place" and insert therefor --placed--. |
| Col. 16, line 37: | Delete "an" and insert therefor --and a--. |

Signed and Sealed this

Twenty-eighth Day of July, 1992

Attest:

DOUGLAS B. COMER

Attesting Officer

Acting Commissioner of Patents and Trademarks